United States Patent [19]

Gray

[11] Patent Number: 5,297,775
[45] Date of Patent: Mar. 29, 1994

[54] LINKAGE ARRANGEMENT FOR STEAM TURBINE VALVES

[75] Inventor: Russell A. Gray, Marblehead, Mass.

[73] Assignee: General Electric Company, Schenectady, N.Y.

[21] Appl. No.: 994,995

[22] Filed: Dec. 22, 1992

[51] Int. Cl.$^5$ .......................................... K16K 31/12
[52] U.S. Cl. ...................................... 251/73; 251/279
[58] Field of Search .................. 251/73, 279, 280, 67

[56] References Cited

U.S. PATENT DOCUMENTS

| | | | |
|---|---|---|---|
| 925,673 | 6/1909 | Zook | 251/280 |
| 1,873,405 | 8/1932 | Hodgkins | 251/280 |
| 3,229,713 | 1/1966 | Wiegand | 251/73 |
| 3,380,479 | 4/1968 | Bassan et al. | 251/280 |
| 3,512,549 | 5/1970 | Wiegand | 251/73 |
| 3,599,930 | 8/1971 | Bourgeot et al. | 251/73 |
| 4,141,533 | 2/1979 | Goodman | 251/280 |

FOREIGN PATENT DOCUMENTS 1282405 11/1968 Fed. Rep. of Germany ...... 251/280

Primary Examiner—George L. Walton
Attorney, Agent, or Firm—Nixon & Vanderhye

[57] ABSTRACT

A linkage device for a steam turbine stop valve includes a support member having a pair of transverse sections separated by a substantially vertical portion; a reciprocal stop valve stem fixed to one of the transverse sections, the stop valve stem extending substantially parallel to but laterally offset from the vertical portion; an actuator rod arranged in substantial axial alignment with the stop valve stem along a force line, one end of the actuator rod extending through a hole in the other of the transverse sections; and a multi link assembly extending between the stop valve stem and the actuator rod, including a first link pivotally secured at a first end to the one transverse section, and a second link pivotally secured at a first end to the actuator rod. Second ends of the first and second links are pivotally secured to each other by a pivot pin. A trip cylinder is utilized to move the pivot pin through the force line, causing the multi link assembly to collapse, thus permitting closure of the valve.

17 Claims, 2 Drawing Sheets

LINKAGE ARRANGEMENT FOR STEAM TURBINE VALVES

TECHNICAL FIELD OF THE INVENTION

This invention relates generally to steam turbine stop valves and more particularly to a valve linkage arrangement configured to permit quick closing of a steam turbine stop valve whether or not an associated valve actuator rod has commenced movement in a valve closing direction.

BACKGROUND PRIOR ART

Steam turbine stop valves are employed as the last line of defense against overspeed and thus, must be completely reliable. Any excessive friction or reduced velocity imposed by the valve opening/closing actuator is unacceptable since required closing times are on the order of 0.2 seconds.

Previous approaches to this problem have focused on the reliability of the valve actuating system per se. High pressure hydraulic cylinders combined with quick-opening dump valves have been employed on the majority of existing turbine stop valves. While such arrangements have been very reliable, they require remote hydraulic power units as well as fluid treatment systems and field installed hydraulic tubing. Other systems employ non-hydraulic actuators in order to eliminate the complication and expense of the hydraulic systems, but actuators of this type to date generally have experienced friction and inertia problems sufficient to slow valve closure beyond acceptable limits.

SUMMARY OF THE INVENTION

This invention provides a linkage arrangement which allows the use of a non-hydraulic actuator, and which permits valve closure even in the event there is no movement of the valve actuator rod.

Thus, a linkage arrangement for a steam turbine stop valve in accordance with an exemplary embodiment of the invention is configured to permit quick closing of a steam turbine stop valve regardless of whether or not the valve opening actuator rod has started to move in the valve closing direction.

In accordance with a first exemplary embodiment of the invention, the valve linkage arrangement includes a pair of links pivotally secured together at first ends, with a remote end of one link pinned (i.e., pivotally secured) to the stop valve stem and the remote end of the other link is pinned to the actuator rod. Thus, the stop valve stem, the pair of trip links, and the actuator rod may be axially aligned along a force direction coincident with the longitudinal axis of the stop valve stem. In other words, assuming for the moment that the pair of trip links were to be locked in axial alignment with both the stop valve stem and the actuator rod, then movement of the actuator rod in the valve closing or valve opening direction would be imparted to the axially aligned stop valve stem.

In the linkage arrangement in accordance with this exemplary embodiment of the invention, a trip cylinder/piston assembly is mounted transversely on a support member generally laterally adjacent (in a normal, deactivated position) the pivot pin by which the pair of trip links are connected. The support member extends generally parallel to the stop valve stem and the actuator rod, and includes transverse sections at opposite ends thereof, one of which is secured by a common pin to the stop valve stem and one of the trip links. The other transverse section is provided with an aperture through which the actuator rod extends, thereby permitting relative sliding movement between the trip cylinder and its support, and the actuator rod.

A spring or other appropriate biasing means extends between the trip cylinder and one of the trip links so that in a normal situation, the trip links are pulled slightly out of alignment, i.e., to one side of the force center line and into engagement with a linkage guide which prevents buckling of the linkage arrangement to that same side of the force center line. Air pressure admitted to the trip cylinder through a three way valve moves the trip cylinder piston and the attached (or integral) plunger to the right as viewed in FIG. 1 until a piston stop tube is encountered. At this point, the system is in the "reset" or deactivated mode, and the actuator can be energized to open the valve. When an upward force is exerted by the actuator rod, the offset positions of the links will nevertheless be maintained by the horizontal component of the upward force, but limited by the linkage guide to prevent buckling.

It should be noted that the trip cylinder is rigidly connected to the stop valve stem by means of one of the transverse sections of the support, so that the trip cylinder moves with the trip links, keeping its plunger always aligned with the pivot pin connecting the pair of trip links (so long as the trip links are not collapsed). The lower transverse section of the trip cylinder support, however, is only guided by the actuator rod, i.e., the actuator rod extends through an aperture in the transverse section so that relative sliding movement is permitted therebetween. With this arrangement, as described in greater detail below, the trip linkage will function even if the actuator rod has malfunctioned and has stuck in any position.

When a valve closing signal has been given simultaneously to the valve actuator rod and to the trip cylinder, and in the event the actuator rod has, for whatever reason, not moved, the dumping of air pressure from the trip cylinder by means of a solenoid actuated three-way valve will cause the trip plunger to impact on the pivot pin and the links will pass through the force center line and immediately collapse with the valve stem pulled in a closing direction (by its own weight and/or an applied biasing force) and the trip cylinder support sliding along the stationary valve actuator rod.

After the actuator rod has been retracted to its valve closed position, the trip plunger is again moved to the right by air pressure admitted to the trip cylinder, thus resetting the system.

In its broader aspects, the invention provides a valve linkage device for insertion between a stop valve stem and a valve actuator rod, wherein the stop valve stem is movable in a first direction to close the stop valve, the linkage device comprising a pair of links extending between the stop valve stem and the actuator rod, one of the links pivotally secured at one end to the stop valve stem and the other of the links pivotally secured at one end to the actuator rod, the pair of links being pivotally secured at other ends to each other, wherein the stop valve stem, actuator rod and pair of links are movable along a free line; first means for moving the pivot pin transversely to the force line in a first direction to offset the pivot pin from the force line in a normal, inoperative position; and second means for moving the pivot pin transversely to the force line in a second direction opposite the first direction to collapse the multi link assembly, thereby permitting the stop valve stem to move along the force line in a valve closing direction.

In another aspect, the present invention provides a linkage device for a steam turbine stop valve comprising a support member having a pair of transverse sections separated by a substantially vertical portion; a reciprocal stop valve stem fixed to one of the transverse sections, the stop valve stem extending substantially parallel to but laterally offset from said vertical portion; an actuator rod arranged in substantial axial alignment with the stop valve stem along a force line, one end of the actuator rod extending through a hole in the other of the transverse sections; and a multi link assembly extending between the stop valve stem and the actuator rod, including a first link pivotally secured at a first end to the one transverse section, and a second link pivotally secured at a first end to the actuator rod; and wherein second ends of the first and second links are pivotally secured to each other by a pivot pin.

In still another aspect, the invention provides a valve linkage device for insertion between a stop valve stem and a valve actuator rod, wherein the stop valve stem is movable in a first direction to close the stop valve, the linkage device comprising a support member having a pair of transverse sections separated by a substantially vertical portion; a reciprocal stop valve stem fixed to one of the transverse sections, the stop valve stem extending substantially parallel to but laterally offset from the vertical portion; an actuator rod arranged in substantial axial alignment with the stop valve stem along a force line, one end of the actuator rod extending through a hole in the other of the transverse sections; and a multi link assembly extending between the stop valve stem and the actuator rod, including a first link pivotally secured at a first end to the one transverse section, and a second link pivotally secured at a first end to the actuator rod; and wherein second ends of the first and second links are pivotally secured to each other by a pivot pin; first means for moving the pivot pin transversely to the force line in a first direction to offset the pivot pin from the force line in a normal, inoperative position; and second means for moving the pivot pin transversely to the force line in a second direction opposite the first direction to collapse the multi link assembly, thereby permitting the stop valve stem to move along the force line in a valve closing direction.

Other objects and advantages of the invention will become apparent from the detailed description which follows.

DETAILED DESCRIPTION OF THE DRAWINGS

Figure 1:
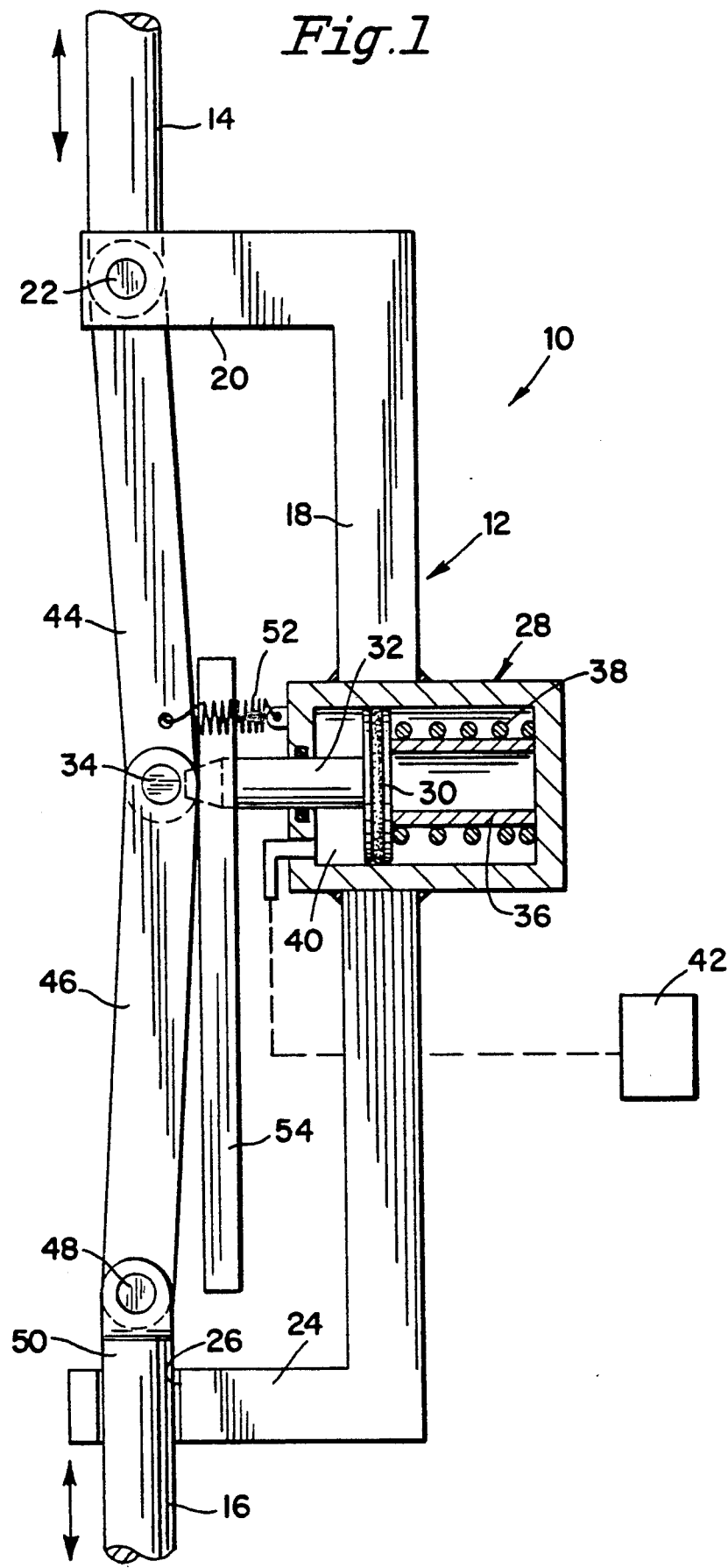
FIG. 1 is a side view of a valve linkage arrangement in accordance with the present invention.

Referring to FIG. 1, the valve trip linkage arrangement in accordance with this invention is shown at 10 and includes a trip cylinder/support assembly 12 which is rigidly attached at one end to a reciprocable stop valve stem 14, and which is slidably connected at an opposite end to a reciprocable valve actuator rod 16. More specifically, the trip cylinder/support assembly 12 includes a substantially vertical, elongated support member 18 which extends substantially parallel to the stop valve stem 14 and the actuator rod 16. The upper end of the support member 18 is formed with a transverse connector 20 which is rigidly attached to the stop valve stem 14 by means of a pin or the like 22. The lower end of the support member 18 is also provided with a transverse connector 24 which is provided with an aperture 26 which permits relative sliding movement between the support assembly 12 and the actuator rod 16.

Intermediate the transverse connectors 20 and 24 of the support assembly 12, there is mounted a trip cylinder 28 and associated piston 30 including a plunger 32 which extends out of the cylinder 28 and which terminates adjacent a horizontally arranged pivot pin 34. The trip cylinder 28 is provided with an internal piston stop tube 36 and a coil spring 38 (or other suitable biasing means) which biases the piston 30 normally in the direction toward the pin 34.

A cylinder chamber 40 forward of the piston 30 communicates with a solenoid operated three-way valve 42 by which air under pressure may be supplied to the chamber 40 or drawn from the chamber 40 depending on the manner in which the solenoid is actuated.

A first trip link 44 extends between the pin 22 located in the transverse connector 20 and the pivot pin 34. A second, similar trip link 46 extends between a pivot pin 48 by which the link 46 is connected to the end 50 of the actuator rod, and the pivot pin 34 (each link 44 and 46 is, in fact, a pair of links, but only one of each pair is shown). It will be appreciated from FIG. 1, that the stop valve stem 14, links 44 and 46 and the actuator rod 16 may be vertically aligned along a force center line which is coincident to the longitudinal axis of the stop valve stem 14 and the actuator rod 16. However, in a normal situation, a spring 52 (or other suitable biasing means) extends between the front face of the cylinder 28 and the trip link 44 to pull the pivot pin slightly to the right of the force centerline to the (exaggerated) position shown in FIG. 1.

In a preferred arrangement, the trip links 44 and 46 may each be provided in the form of a pair of laterally spaced trip links such that the transverse sections 20 and 24 of the support assembly 12 are outside of the links.

One or more fixed guide rails provide a stop for horizontal movement of the pin 34 and adjacent ends of links 44 and 46 (as shown in FIG. 1), as explained further herein below.

Under normal conditions, air pressure is admitted to the trip cylinder chamber 40 through the solenoid operated three-way valve 42 so as to move the piston 30 and plunger 32 to the right as viewed in FIG. 1 until the piston stop tube 36 is engaged by the piston 30. At the same time, under the influence of spring 52, the links 44 and 46 will engage the guide rail 54 such that pin 34 is slightly offset with respect to the vertical force centerline extending along the longitudinal axis of the stop valve stem 14 and actuator rod 16. At this point, the system is in a "reset" or deactivated mode. Under normal circumstances, the actuator (not shown) may be energized to open the valve (also not shown), and when an upward (opening) force is exerted by the actuator rod 16 under conditions as illustrated in FIG. 1, the offset position of the links 44 and 46 will be maintained by the rightward pull exerted by the spring 50, and the entire unit will move upwardly as a single element, to a valve "open" position. Thus, the plunger 32 remains in alignment with the pin 34, and links 44, 46 are prevented from buckling (to the right in FIG. 2) by the linkage guide 54.

Figure 2:
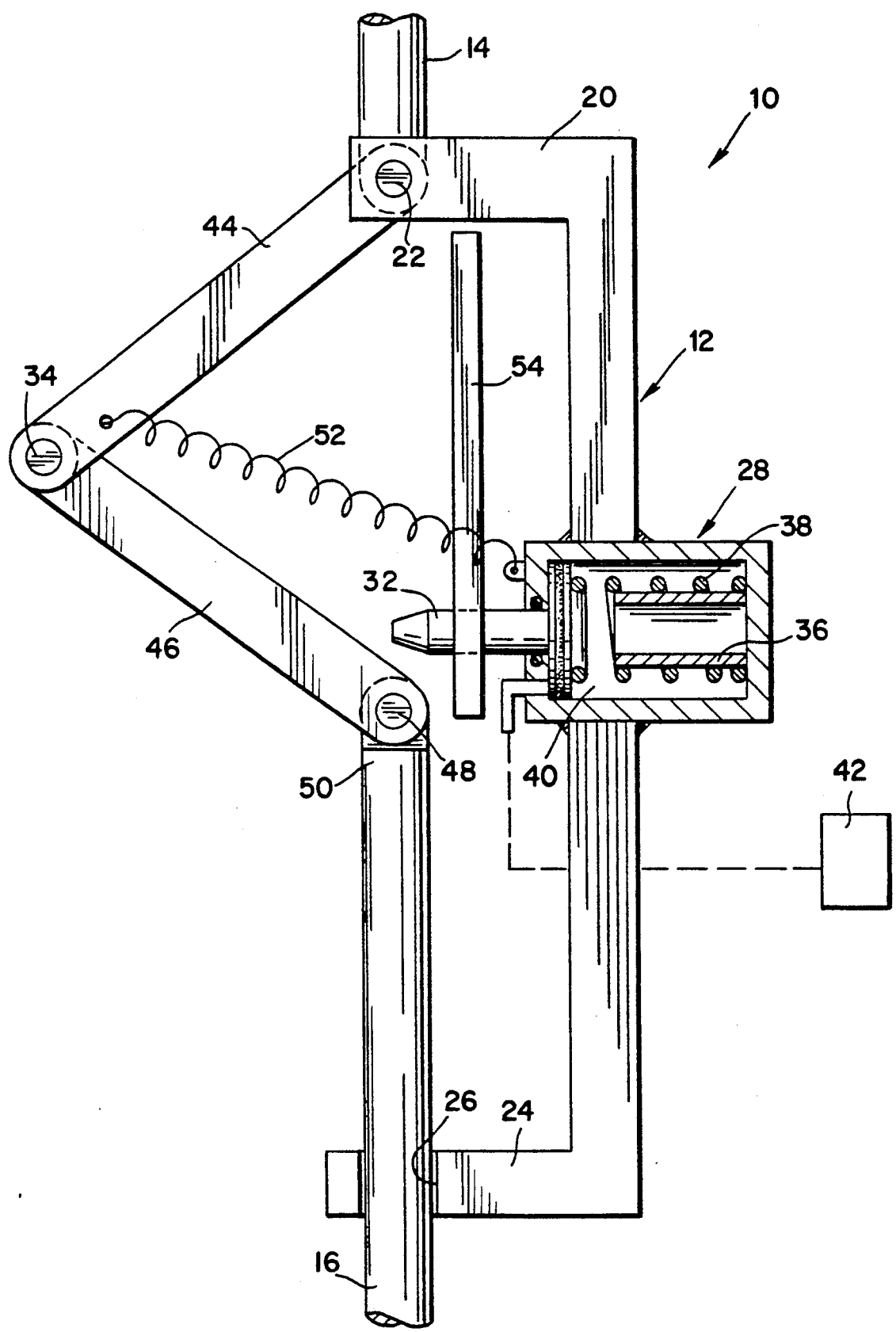
FIG. 2 is a side view of the valve linkage arrangement illustrated in FIG. 1, but with the linkage arrangement collapsed as a result of the valve closing signal.

Turning now to FIG. 2, there is illustrated a situation where valve closing signals have been given simultaneously to the valve actuator rod 16 and to the trip cylinder 28. In the event the actuator rod 16 does not move in response to valve closing signal, the three way valve 42 is actuated to dump the air under pressure in the chamber 40 of the trip cylinder 28 thus causing the plunger 32 to act under the influence of spring 38 to impact on the pin 34, pushing the pin 34 to the left of the vertical force center line. This movement causes an immediate collapse of the trip links 44 and 46 about the pivot pin 34, permitting the stop valve stem 14 to move downwardly to a valve closing position while the support assembly 12 travels downwardly along the stationary actuator rod 16. In this regard, the valve may be spring biased to a closed position so that once the pivot pin A is pushed through the force center line, the trip links collapse as a result of the spring biasing action on the valve and valve stem 14. The weight of the valve itself may also be used to close the valve, i.e., when the pivot pin A is moved through the force center line, the trip links will collapse under the weight of the valve. A combination of biasing force and valve weight may also be employed. Accordingly, even though the valve actuator rod 16 is malfunctioning, the turbine stop valve may be quickly and reliably closed.

Upon return of the valve actuator rod 16 to the valve closed position, and upon movement of the plunger 32 to the right by air pressure into the chamber 40, the stop valve may then be opened and the system will appear as shown in FIG. 1 with the spring 52 pulling the pin 34 slightly to the right of the force center line.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A linkage device for a steam turbine stop valve comprising:
    a support member having a pair of transverse sections separated by a substantially vertical portion;
    a stop valve stem mounted for reciprocating motion along a longitudinal axis of the stem and fixed to one of said transverse sections, said stop valve stem extending substantially parallel to but laterally offset from said vertical portion, such that said support member is movable with said stop valve stem;
    an actuator rod arranged in substantial axial alignment with said stop valve stem for reciprocating movement with said valve stem under a normal valve closing condition, one end of said actuator rod extending through a hole in the other of said transverse sections;
    a multi link assembly extending between said stop valve stem and said actuator rod, including a first link pivotally secured at a first end to said one transverse section, and a second link pivotally secured at a first end to said actuator rod; and wherein second ends of said first and second links are pivotally secured to each other by a pivot pin; and means for moving said pivot pin in a direction substantially perpendicular to said longitudinal axis under an abnormal valve closing condition when said actuator rod does not move with said valve stem to thereby collapse said multi-link assembly and permit said stop valve stem and said support member to move relative to said actuator rod, with said other of said transverse sections of said support member moving along said actuator rod via said hole.

2. The linkage device of claim 1 wherein said means comprises a trip cylinder rigidly secured along said substantially vertical portion intermediate said transverse sections, said trip cylinder including a piston and a plunger connected to said piston and adapted to engage said pivot pin in said substantially perpendicular direction.

3. The linkage device of claim 1 wherein a first spring is provided which, in a normal valve open position, pulls said pivot pin out of vertical alignment with said stop valve stem and said actuator rod.

4. The linkage device of claim 3 wherein said spring pulls said pivot pin in a first direction toward said plunger.

5. The linkage device of claim 4 wherein said plunger is normally biased away from said pivot pin.

6. The linkage device of claim 5 wherein said plunger is normally biased away from said pivot pin by air under pressure in a chamber of said cylinder.

7. The linkage device of claim 6 and including a second spring in said trip cylinder, and wherein means are provided for dumping the air from said chamber under said abnormal valve closing condition, to thereby permit said second spring to drive said plunger into engagement with said pivot pin, thereby causing collapse of said first and second links.

8. The linkage device of claim 3 and including a stop limit for stopping movement of said pivot pin in said first direction.

9. The linkage device of claim 7 wherein said means comprises a three-way valve.

10. A valve linkage device for insertion between as stop valve stem and a valve actuator rod, wherein said stop valve stem is movable under a normal valve closing condition with said actuator rod in a first axial direction to close said stop valve in response to a valve close signal to said actuator rod, the linkage device comprising:
    a support member having a pair of transverse sections separated by a substantially vertical portion;
    a stop valve stem mounted for reciprocating motion along a longitudinal axis of the stem and fixed to one of said transverse sections, said stop valve stem extending substantially parallel to but laterally offset from said vertical portion;
    an actuator rod arranged in substantial axial alignment with said stop valve stem for reciprocating movement with said valve stem in a normal operating mode, one end of said actuator rod extending through a hole in the other of said transverse sections; and
    a multi link assembly extending between said stop valve stem and said actuator rod, including a first link pivotally secured at a first end to said one transverse section, and a second link pivotally secured at a first end to said actuator rod; and wherein second ends of said first and second links are pivotally secured to each other by a pivot pin;

first means for moving said pivot pin transversely to said force line in a first direction to offset said pivot pin from said force line in a normal valve closing operating mode; and second means for moving said pivot pin transversely relative to said longitudinal axis in a second direction opposite said first direction in an abnormal valve closing operating mode where said valve actuator rod does not move in response to the valve closing signal, to thereby collapse said multi link assembly and permit said stop valve stem and said support member to travel relative to said actuator rod along said longitudinal axis in a valve closing direction, with said other of said transverse sections slidable along said actuator rod via said hole.

11. The linkage device of claim 10 wherein said second means comprises a trip cylinder rigidly secured along said substantially vertical portion intermediate said transverse sections, said trip cylinder including a piston and a plunger connected to said piston and adapted to engage said pivot pin from a direction substantially perpendicular to said stop valve stem and said actuator rod.

12. The linkage device of claim 11 wherein said first means comprises a first spring connection between one of said first and second links and said trip cylinder.

13. The linkage device of claim 11 wherein said plunger is normally biased away from said pivot pin.

14. The linkage device of claim 13 including a second spring in said trip cylinder, rearward of the piston, and wherein third means are provided for dumping the air from said chamber, to thereby permit said second spring to drive said plunger into engagement with said pivot pin, thereby causing collapse of said first and second links.

15. The linkage device of claim 14 and including a stop limit for stopping movement of said pivot pin in said first direction.

16. The linkage device of claim 14 wherein said third means comprises a three-way valve.

17. In a steam turbine, a valve linkage device for insertion between as stop valve stem and an axially aligned valve actuator rod, wherein said stop valve stem and said valve actuator rod are normally movable together in a valve closing direction to close said stop valve, the linkage device comprising:

a pair of links extending between the stop valve stem and the actuator rod, one of said links pivotally secured at one end to the stop valve stem and the other of said links pivotally secured at one end to the actuator rod, the pair of links being pivotally secured at other ends to each other, wherein the stop valve stem, actuator rod and pair of links are normally movable along a force line;

first means for moving said pivot pin transversely to said force line in a first direction to offset said pivot pin from said force line in a normal valve closing operating mode; and second means for moving said pivot pin transversely to said force line in a second direction opposite said first direction in an abnormal valve closing operating mode where said actuator rod fails to move along said force line in response to a valve closing signal, to collapse said multi link assembly and for permitting said stop valve stem to travel along said force line relative to said actuator rod in said valve closing direction.

* * * * *